United States Patent
Zhang et al.

(10) Patent No.: US 11,658,924 B2
(45) Date of Patent: May 23, 2023

(54) BUFFER ALLOCATION METHOD, AND DEVICE

(71) Applicant: HUAWEI TECHNOLOGIES CO., LTD., Guangdong (CN)

(72) Inventors: Yongping Zhang, Beijing (CN); Bailing Li, Beijing (CN); Xiongwei Zhang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 241 days.

(21) Appl. No.: 17/134,976

(22) Filed: Dec. 28, 2020

(65) Prior Publication Data

US 2021/0119943 A1    Apr. 22, 2021

Related U.S. Application Data

(63) Continuation of application No. PCT/CN2019/093640, filed on Jun. 28, 2019.

(30) Foreign Application Priority Data

Jun. 30, 2018    (CN) .................. 201810702803.X

(51) Int. Cl.
*H04L 49/9005* (2022.01)
*H04L 47/62* (2022.01)
*H04L 49/9047* (2022.01)

(52) U.S. Cl.
CPC ...... *H04L 49/9005* (2013.01); *H04L 47/6215* (2013.01); *H04L 49/9052* (2013.01)

(58) Field of Classification Search
None
See application file for complete search history.

(56) References Cited

U.S. PATENT DOCUMENTS

| 7,464,398 | B2 * | 12/2008 | Robert ............... H04L 9/40 713/168 |
|---|---|---|---|
| 8,797,877 | B1 | 8/2014 | Perla et al. |
| 9,674,104 | B1 | 6/2017 | Pan et al. |
| 2003/0058802 | A1 | 3/2003 | Jones et al. |
| 2017/0289001 | A1 | 10/2017 | White et al. |

FOREIGN PATENT DOCUMENTS

| CN | 1937594 | A | 3/2007 |
|---|---|---|---|
| CN | 102916903 | A | 2/2013 |
| CN | 104022965 | A | 9/2014 |
| CN | 104302008 | A | 1/2015 |
| CN | 105610729 | A | 5/2016 |

* cited by examiner

*Primary Examiner* — Alex Skripnikov
(74) *Attorney, Agent, or Firm* — Womble Bond Dickinson (US) LLP

(57) ABSTRACT

This application provides a buffer allocation method and a device. The method includes determining, by a device, a first output rate of a first queue on the device and a second output rate of a second queue on the device. The method also includes separately allocating, by the device, a first buffer to the first queue and a second buffer to the second queue based on a ratio of the first output rate to the second output rate. The device separately allocates a buffer to each of queues based on a ratio of output rates of the queues, so that a ratio of output traffic of the queues meets an expected scheduling ratio.

12 Claims, 3 Drawing Sheets

BUFFER ALLOCATION METHOD, AND DEVICE

CROSS-REFERENCE TO RELATED APPLICATIONS

This application is a continuation of International Application No. PCT/CN2019/093640, filed on Jun. 28, 2019, which claims priority to Chinese Patent Application No. 201810702803.X, filed on Jun. 30, 2018. The disclosures of the aforementioned applications are hereby incorporated by reference in their entireties.

TECHNICAL FIELD

The present invention relates to the field of communications technologies, and in particular, to a buffer allocation method and a device.

BACKGROUND

For a device in a network, a buffer management mechanism can effectively relieve network congestion and reduce a packet loss rate generated when the device forwards a data stream, and plays a very important role in maintaining integrity of the data stream. In a conventional buffer management mode, buffered data streams are grouped into different queues according to different standards, for example, may be grouped into different queues based on subscriber identifiers, or grouped into different queues based on port identifiers carried in packets. Because there are long queues and short queues in a buffer, when data traffic rates are different, the long queues greatly occupy the buffer. This affects normal use of the buffer by other queues.

To prevent one or more queues from occupying static storage space of other non-burst queues or to prevent a relatively short queue from being discarded because the relatively short queue cannot use the buffer, a management mechanism combining sharing and exclusiveness is widely applied. In this management mode, the network device divides a part of the buffer into several equal exclusive buffers based on a quantity of access users, and a queue preferentially uses its own exclusive buffer. When a queue length is greater than an allocated exclusive buffer, the user can use a shared buffer. In the buffer management mode, an access queue may preempt the shared buffer. A larger data stream preempts a larger buffer, and smaller data traffic preempts a smaller buffer. Consequently, a ratio of data streams output by an outbound interface of the device is uncoordinated and inaccurate.

SUMMARY

Embodiments of this application provide a buffer allocation method and a device. The device separately allocates a buffer to each of queues based on a ratio of output rates of the queues, so that a ratio of output traffic of the queues meets an expected scheduling ratio.

According to a first aspect, this application provides a buffer allocation method. The method includes: determining, by a device, a first output rate of a first queue on the device and a second output rate of a second queue on the device; and separately allocating, by the device, a buffer to the first queue and a buffer to the second queue based on a ratio of the first output rate to the second output rate.

According to the foregoing method, in a process of forwarding traffic by the device, the device allocates a buffer to each of queues based on a ratio of output rates of the queues. In this way, a ratio of output traffic of the queues meets an expected scheduling ratio of a user, thereby improving network user satisfaction.

With reference to the first aspect, in a first possible embodiment, the separately allocating, by the device, a buffer to the first queue and a buffer to the second queue based on a ratio of the first output rate to the second output rate includes: determining, by the device, a first ratio of the first output rate to the second output rate; determining, by the device based on the first ratio of the first output rate to the second output rate, a second ratio of the buffer to be allocated to the first queue to the buffer to be allocated to the second queue; and separately allocating, by the device, the buffer to the first queue and the buffer to the second queue based on the second ratio and a buffer of the device.

In the foregoing method, the device determines, based on the first ratio of the first output rate to the second output rate, the second ratio of the buffer to be allocated to the first queue to the buffer to be allocated to the second queue, so that a ratio of output traffic of the first queue to output traffic of the second queue can meet an expected scheduling ratio.

With reference to the first aspect, in a second possible embodiment, the separately allocating, by the device, a buffer to the first queue and a buffer to the second queue based on a ratio of the first output rate to the second output rate includes: determining, by the device, that a sum of buffers occupied, on the device, by a plurality of queues is greater than or equal to a threshold, where the threshold is determined based on a size of the buffer of the device, and the plurality of queues include the first queue and the second queue; and after the determining, by the device, that a sum of buffers occupied, on the device, by the plurality of queues is greater than or equal to a threshold, separately allocating, by the device, the buffer to the first queue and the buffer to the second queue based on the ratio of the first output rate to the second output rate.

In the foregoing method, after determining that the sum of the buffers occupied, on the device, by the plurality of queues is greater than or equal to the threshold, the device allocates the buffer to the first queue and the buffer to the second queue, to ensure that a ratio of output traffic of the first queue to output traffic of the second queue meets a specific scheduling ratio.

With reference to the first aspect, in a third possible embodiment, the determining, by a device, a first output rate of a first queue on the device and a second output rate of a second queue on the device includes: determining, by the device, the first output rate based on first duration and a volume of output traffic of the first queue in the first duration; and determining, by the device, the second output rate based on second duration and a volume of output traffic of the second queue in the second duration. The first duration may be the same as the second duration, or may be different from the second duration.

With reference to the first aspect, in a fourth possible embodiment, the device further includes a third queue. The device determines a third output rate of the third queue on the device. The device separately allocates the buffer to the first queue, the buffer to the second queue, and a buffer to the third queue based on a ratio relationship among the first output rate, the second output rate, and the third output rate.

With reference to the first aspect, in a fifth possible embodiment, the device separately allocates the buffer to the first queue and the buffer to the second queue based on the ratio of the first output rate to the second output rate. A size of the buffer of the first queue is a product of the output rate of the first queue and buffer time of the first queue. A size of the buffer of the second queue is a product of the output rate of the second queue and buffer time of the second queue.

According to a second aspect, this application provides a terminal, configured to perform the method according to any one of the first aspect or the possible designs of the first aspect. The device includes a module configured to perform the method according to any one of the first aspect or the possible embodiments of the first aspect.

According to a third aspect, this application provides a device, including a network interface, a processor, and a memory. The network interface, the processor, and the memory may be connected through a bus system. The memory is configured to store a program, an instruction, or code. The processor is configured to execute the program, the instruction, or the code in the memory, to perform an operation other than information receiving and sending performed by the device in the method in any one of the first aspect or the possible designs of the first aspect.

According to a fourth aspect, this application provides a computer-readable storage medium. The computer-readable storage medium stores an instruction. When the instruction is run on a computer, the computer is enabled to execute an instruction of the method in any one of the first aspect or the possible embodiments of the first aspect.

DESCRIPTION OF EMBODIMENTS

Figure 1:
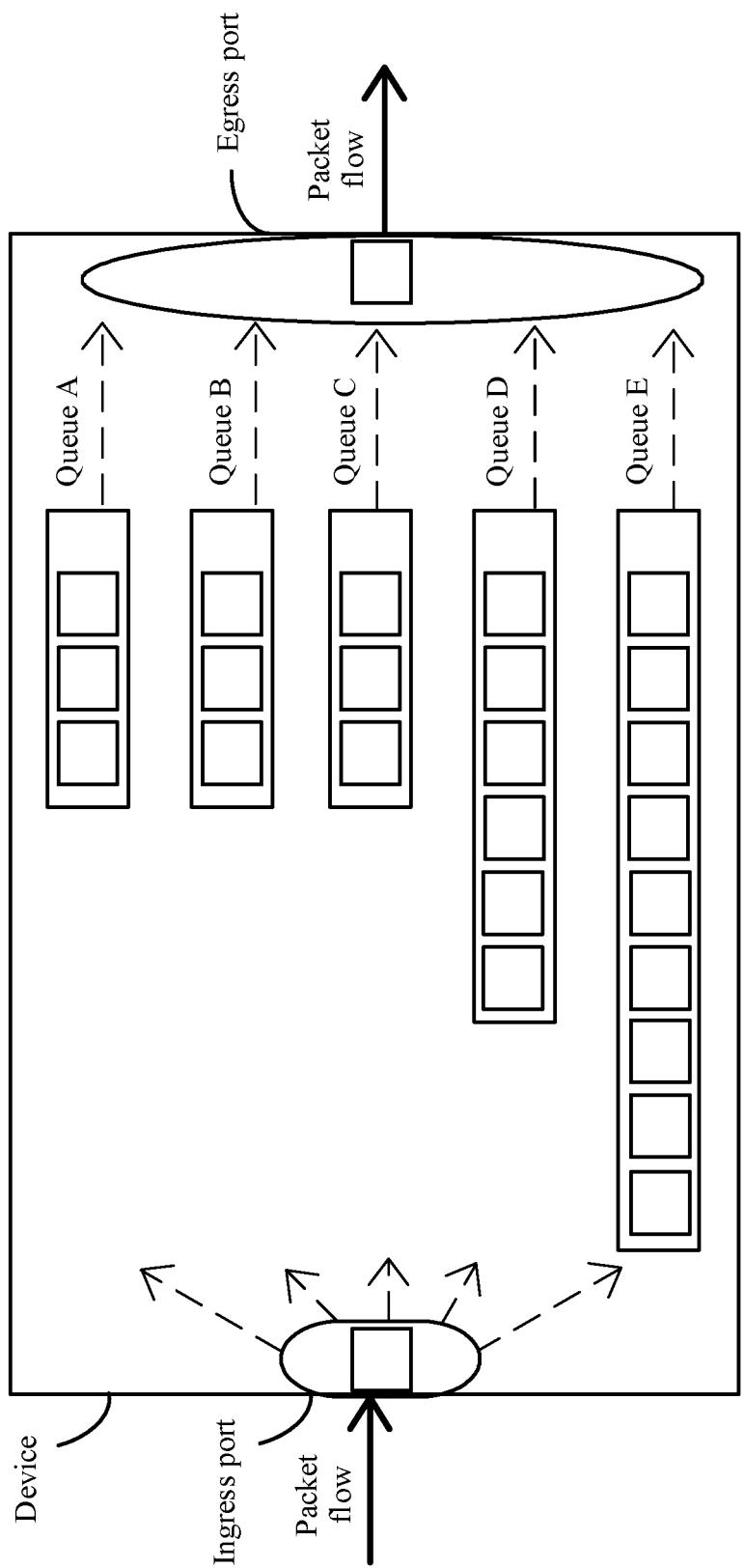
FIG. 1 is a schematic diagram of a scenario in which a device sends queues according to an embodiment of this application.

In the specification, claims, and accompanying drawings of the present invention, the terms "first", "second", and so on are intended to distinguish between similar objects but do not necessarily indicate a specific order or sequence. Moreover, the terms "include", "contain " and any other variants mean to cover the non-exclusive inclusion, for example, a process, method, system, product, or device that includes a list of operations or units is not necessarily limited to those operations or units expressly listed, but may include other operations or units not expressly listed or inherent to such a process, method, product, or device.

A "queue" in this application refers to space for storing a packet by a device. When the device receives too many packets and cannot process the packets in a timely manner, the device stores the packets that cannot be processed in a timely manner into queues. The device groups the received packets into different queues based on an algorithm. To be specific, the received packets may be grouped into different queues by using the algorithm and based on 5-tuples, MAC, protocol numbers, labels, or the like of the packets.

A "buffer" in this application refers to temporary storage space of a device, a buffer of a device, or a memory buffer of a device. The buffer is configured to store data and packets in various formats, to relieve congestion. The device may actively discard, by monitoring a queue or buffer usage of the device, a packet when congestion occurs or becomes severe.

Network congestion occurs when a plurality of users contend, on a shared network, for same bandwidth, a same buffer, or the like. To cope with the network congestion caused by the contention for the same buffer of the device, a related method for managing the buffer of the device includes three modes: a management mode of exclusiveness, a management mode of sharing, and a management mode combining exclusiveness and sharing. In the three modes, usage of network resources, such as queues or memory buffers, is monitored, so that all packets sent from an interface are placed in a plurality of queues by using a queue technology, and are processed according to a related queue scheduling method. When network congestion becomes severe, a flow control mechanism is to adjust network traffic by actively discarding a packet, to relieve network overload.

In the management mode of exclusiveness, the device needs to allocate an independent buffer to each access user to buffer packets of the user. This mode can ensure that each user has a fixed buffer. However, a disadvantage of this mode is that the buffer is fixedly occupied even if the user does not have traffic to be buffered, causing a waste of the buffer. In the management mode of sharing, a static buffer is no longer separately allocated to each access user, and all users share a shared buffer. In this mode, a waste of a buffer is reduced. However, a disadvantage is that a queue with more traffic occupies a larger buffer. To be specific, a user with more traffic forcibly uses a buffer of a user with less traffic. Consequently, a queue of another user cannot be allocated a buffer. In the management mode combining exclusiveness and sharing, the device allocates an independent static buffer to each access queue to buffer packets of a user, and a queue preferentially occupies an exclusive buffer allocated to a user. If the exclusive buffer is used up by the user, the user can use a shared buffer. Although in this mode, advantages and disadvantages of the management mode of exclusiveness and the management mode of sharing are comprehensively considered, there still are a large quantity of access queues preempting the shared buffer, a user with larger access traffic preempts a larger buffer, and a user with smaller access traffic preempts a smaller buffer. Consequently, a ratio of user traffic output by an outbound interface of the device is uncoordinated.

In the management mode combining exclusiveness and sharing, when a sum of buffers occupied by queues on the device exceeds statically allocated buffers, the queues occupy the shared buffer by considering only input traffic of the queues instead of considering output rates of the queues. Consequently, a ratio of occupation in the buffers of input traffic of different queues does not match a ratio of output traffic of the queues. Consequently, scheduling between users is uncoordinated. FIG. 1 is a schematic diagram of a scenario in which a device buffers packets according to this application. The device receives the packets from an ingress port, classifies the packets according to a specific standard, and inputs the packets into different queues A, B, C, D, and E. Each queue outputs packets in the queue through an egress port according to methods such as priority queuing (PQ), weighted round robin (WRR), or weighted fair queuing (WFQ). With reference to Table 1, the following further describes a device buffer allocation method. Bandwidth of an outbound interface of the device is 1 gigabit per second (Gbit/s), and the device includes buffer space of 50 megabytes (MB), namely, 400 bits. Packets in the five queues A, B, C, D, and E are output from the outbound interface of the device, as shown in Table 2 below.

TABLE 1

| Queue | Input bandwidth (bit/s) | Queue scheduling manner | Scheduling weight | Rate limit configured for a queue (bit/s) | Queue buffer time | Bandwidth of an outbound interface (bit/s) | Actual output bandwidth of a queue (bit/s) |
|---|---|---|---|---|---|---|---|
| A | 500M | WFQ | 1 | 1 G | 100 ms | 1 G | 200M |
| B | 500M | WFQ | 1 | 1 G | 100 ms | | 200M |
| C | 500M | WFQ | 1 | 1 G | 100 ms | | 200M |
| D | 1 G | WFQ | 1 | 1 G | 100 ms | | 200M |
| E | 1.5 G | WFQ | 1 | 1 G | 100 ms | | 200M |

It can be learned from data in Table 1 that, buffers allocated by the device to all queues based on rate limits configured for all the queues by users and queue buffer time are: queue A: (1 G×100 ms)/8=12.5 MB; queue B: (1 G×100 ms)/8=12.5 MB; C: (1 G×100 ms)/8=12.5 MB; D: (1 G×100 ms)/8=12.5 MB; and E: (1 G×100 ms)/8=12.5 MB. In this allocation mode, a sum of buffers occupied by the five queues is 62.5 MB, and is greater than a 50 MB static buffer set by the device. Therefore, a queue with larger input traffic preempts a larger buffer, as shown in Table 2 below. Consequently, queues D and E with larger input traffic preempt larger buffers, and queues with smaller input traffic preempt smaller buffers.

TABLE 2

| Queue | Input (bit/s) | Preempted static buffer (bit) |
|---|---|---|
| A | 500M | 25M |
| B | 500M | 25M |
| C | 500M | 25M |
| D | 1 G | 50M |
| E | 1.5 G | 75M |

In a buffer management mode shown in Table 2, formulas for calculating total output traffic of the queues A and E within a time t are: output traffic of the queue A=(200 M×t+25 M) bits; and output traffic of the queue E=(200 M×t+75 M) bits. It can be learned, through calculation based on values oft, that a ratio of the output traffic of the queue A to the output traffic of the queue E cannot reach 1:1. To be specific, the ratio of 1:1 cannot be equal to a ratio of a traffic output rate of the queue A to a traffic output rate of the queue E. If the foregoing plurality of queues correspond to different users, a user with larger traffic not only preempts a larger buffer of the device, but also outputs more traffic. Consequently, a ratio of buffers occupied by queues of users does not match a ratio of rates of output traffic of the queues of the users. As a result, a ratio of the output traffic between the users is inaccurate.

To resolve the foregoing technical problems, this application provides a device buffer allocation method. In the method, output rates of queues are monitored in real time, to determine actual buffer allocation values of the queues. Limited network resources are properly allocated based on allocation of buffers, to ensure that a ratio of output traffic of the queues meets an expectation. The method is applicable to a management mode of sharing of a buffer, or a management mode combining exclusiveness and sharing of a buffer. In the method, allocating a buffer to a queue by a device means performing allocation in a shared buffer of the device.

Figure 2:
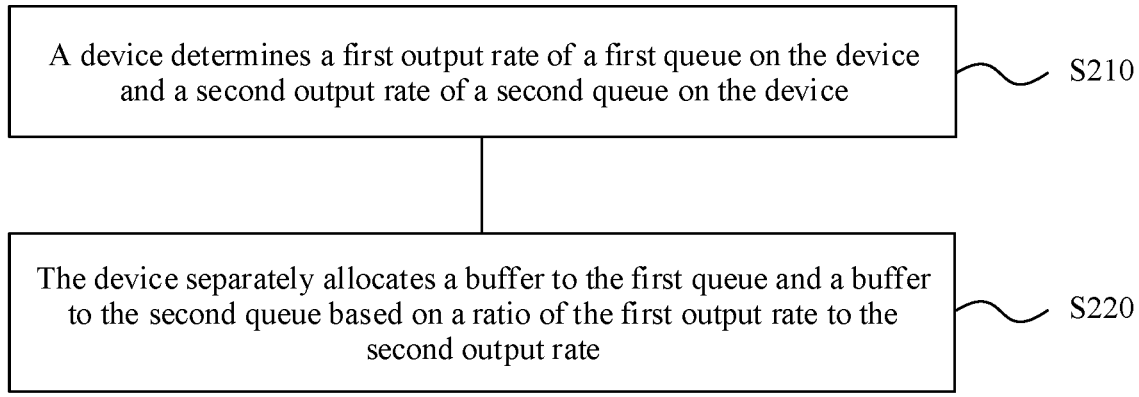
FIG. 2 is a schematic flowchart of a buffer allocation method according to an embodiment of this application.

To allocate a buffer of a device, FIG. 2 is a schematic flowchart of a device buffer allocation method according to this application. The method includes the following content.

S210: The device determines a first output rate of a first queue on the device and a second output rate of a second queue on the device.

In an embodiment, a device in a network receives packets, and may input the packets into different queues based on identifiers of the packets. The identifiers may be a 5-tuple, media access control (MAC), a protocol number, a subscriber identifier, a device port number, or the like of the packets. The device groups the packets based on the identifiers and inputs the packets into different queues. For example, a router may groups the packets into eight different queues based on subscriber identifiers in the packets, and the eight different queues correspond to eight different users.

In an embodiment, the device may be a switching node, to be specific, a device such as a router or a switch, configured to forward a packet, in a network. The device may monitor an output rate of each queue in real time through a control layer. The output rate of each queue is related to an input rate of the queue, a weight of the queue, and a rate limit value of the queue. The device may monitor a volume of output traffic of each queue within a specified time, to obtain the output rate of the queue through calculation.

In an embodiment, the device determines the first output rate based on first duration and a volume of output traffic of the first queue in the first duration. The device determines the second output rate based on second duration and a volume of output traffic of the second queue in the second duration. The first duration may be the same as the second duration, or may be different from the second duration.

For example, if the device reads, at a moment T1, a data stream size of the first queue is s1, and reads, at a moment T2, a data stream size of the first queue is s2, an output rate R1 of the first queue is $R1=(s2-s1)/(T2-T1)$. The output rate of the queue is related to an input rate of the queue, a weight of the queue, and a rate limit value of the queue. Alternatively, if a volume of traffic that is of the second queue and that is output by the device in duration T2 is M, an output rate R2 of the second queue is $R2=M/T2$.

S220: The device separately allocates a buffer to the first queue and a buffer to the second queue based on a ratio of the first output rate to the second output rate.

In an embodiment, the device determines that the ratio of the first output rate to the second output rate is a first ratio. For example, the first ratio is 1:1. The device determines, based on the first ratio of the first output rate to the second output rate, a second ratio of the buffer to be allocated to the first queue to the buffer to be allocated to the second queue. For example, the second ratio is equal to the first ratio. That is, the second ratio is also 1:1. The device separately allocates the buffer to the first queue and the buffer to the second queue based on the second ratio and the buffer of the device. For example, a ratio of the buffer to be allocated by the device to the first queue to the buffer to be allocated by the device to the second queue is also 1:1, and the buffer of the device is 100 MB. In this case, the buffer that can be allocated by the device to the first queue is 50 MB, and the buffer that can be allocated by the device to the second queue is 50 MB.

In an embodiment, the device stores a buffer threshold. The threshold may be equal to a size of the buffer of the device, or less than a value of the buffer of the device, or may be in a particular ratio to a value of the buffer of the device, but cannot be greater than the value of the buffer of the device. The threshold may be set based on a requirement. The device can obtain a sum of buffers actually occupied by a plurality of queues through real-time monitoring. After determining that the sum of the buffers occupied, on the device, by the plurality of queues is greater than or equal to the threshold, the device separately allocates the buffer to the first queue and the buffer to the second queue based on the ratio of the first output rate to the second output rate.

In an embodiment, the device further includes a third queue. The device determines a third output rate of the third queue on the device. The device separately allocates the buffer to the first queue, the buffer to the second queue, and a buffer to the third queue based on a ratio relationship among the first output rate, the second output rate, and the third output rate.

In an embodiment, the device may determine, based on the ratio of the output rate of the first queue to the output rate of the second queue, buffer time of the first queue, and buffer time of the second queue, the buffer to be separately allocated to the first queue and the buffer to be separately allocated to the second queue. For example, the device determines that the ratio of the output rate of the first queue to the output rate of the second queue is 1:1. The device may obtain, through calculation based on the buffer time of the first queue and the buffer time of the second queue, the buffer to be separately allocated by the device to the first queue and the buffer to be separately allocated by the device to the second queue. The device processes packets based on the buffers allocated to the first queue and the second queue.

In an embodiment, the device separately allocates the buffer to the first queue and the buffer to the second queue based on the ratio of the first output rate to the second output rate. A size of the buffer of the first queue is a product of the output rate of the first queue and the buffer time of the first queue. A size of the buffer of the second queue is a product of the output rate of the second queue and the buffer time of the second queue.

For example, as shown in Table 3 below, when the device determines that a sum of buffers actually occupied by queues A, B, C, D, and E is greater than or equal to the threshold. The device determines that a ratio of a 200 megabits per second (Mbps) output rate of the queue A to a 200 Mbps output rate of the queue E is 1:1. If buffer time of the queue A and buffer time of the queue E are both 100 ms, the device separately allocates a buffer to the queue A and a buffer to the queue E: buffer of the queue A=200 Mbps×100 ms=20 M bits. According to a same calculation method, buffer of the queue E=200 Mbps×100 ms=20 M bits. According to this buffer allocation method, a ratio of output traffic of the queues A and E meets a scheduling ratio of 1:1.

TABLE 3

| Queue | Input rate (bit/s) | Actual output rate (bit/s) | Queue buffer time | Dynamic buffer allocation size (Bit) |
|---|---|---|---|---|
| A | 700M | 200M | 100 ms | 2.5 MB |
| B | 700M | 200M | 100 ms | 2.5 MB |
| C | 1.2 G | 200M | 100 ms | 2.5 MB |
| D | 1.2 G | 200M | 100 ms | 2.5 MB |
| E | 1.2 G | 200M | 100 ms | 2.5 MB |

In an embodiment, the foregoing method further includes: processing, by the device, packets of the first queue and the second queue based on the buffer separately allocated to the first queue and the buffer separately allocated to the second queue. When the device determines that the buffer allocated to the first queue is greater than a buffer actually occupied by the first queue, the device inputs a packet into the first queue. When the device determines that the buffer allocated to the first queue is less than a buffer actually occupied by the first queue, the device discards a packet input into the first queue.

In an embodiment, the device separately allocates the buffer to the first queue and the buffer to the second queue according to the foregoing method. If the buffer allocated by the device to the first queue is greater than a buffer actually occupied by the first queue, the buffer allocated by the device to the first queue has some idle parts, and when the buffer of the second queue is insufficient, the idle parts of the buffer of the first queue may be occupied by the second queue.

According to the foregoing method, a phenomenon that a larger data stream preempts a larger buffer is avoided. Instead, the buffer of the device is allocated based on an input rate and an output rate of a data stream, to properly use the buffer. This ensures that output traffic reaches an expectation, and improves network performance.

Figure 3:
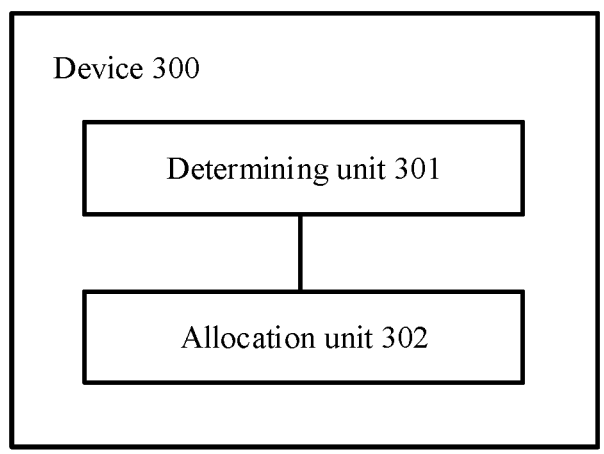
FIG. 3 is a schematic structural diagram of a device according to an embodiment of this application.

FIG. 3 is a schematic structural diagram of a device 300 according to an embodiment of this application. The device 300 may be the device in FIG. 1, or may be the device in the method flowchart in FIG. 2; and has functions of the device in FIG. 2. The device includes a determining unit 301 and an allocation unit 302. The determining unit 301 is configured to determine a first output rate of a first queue on the device and a second output rate of a second queue on the device. The allocation unit 302 is configured to separately allocate a buffer to the first queue and a buffer to the second queue based on a ratio of the first output rate to the second output rate.

In an embodiment, the determining unit 301 is configured to determine that the ratio of the first output rate to the second output rate is a first ratio. The determining unit 301 is further configured to determine, based on the first ratio of the first output rate to the second output rate, that a ratio of the buffer to be allocated to the first queue to the buffer to be allocated to the second queue is a second ratio. For example, the first ratio may be equal to the second ratio. The allocation unit 302 is configured to separately allocate the buffer to the first queue and the buffer to the second queue based on the second ratio and a buffer of the device. For example, the device determines, based on the first ratio, that the second ratio is 1:1, and a size of the buffer of the device is 100 MB. In this case, the buffers to be allocated by the device to the first queue and the second queue are both 50 MB.

In an embodiment, the determining unit 301 is further configured to determine that a sum of buffers occupied, on the device, by a plurality of queues is greater than or equal to a threshold. The threshold is determined based on the size of the buffer of the device, and the threshold is less than or equal to a value of the buffer of the device. The plurality of queues may include the first queue and the second queue, and may further include a third queue. The allocation unit 302 is configured to: after the determining unit 301 determines that the sum of the buffers occupied, on the device, by the plurality of queues is greater than or equal to the threshold, separately allocate the buffer to the first queue and the buffer to the second queue based on the ratio of the first output rate to the second output rate. For example, the threshold of the buffer of the device is 90 MB. After determining that the buffers actually occupied by the plurality of queues are 90 MB, the device starts a buffer allocation mechanism, and separately allocates the buffer to the first queue and the buffer to the second queue based on the ratio of the first output rate to the second output rate.

In an embodiment, the determining unit 301 is configured to determine the first output rate based on first duration and a volume of output traffic of the first queue in the first duration. The determining unit 301 is configured to determine the second output rate based on second duration and a volume of output traffic of the second queue in the second duration.

In an embodiment, the allocation unit 302 separately allocates the buffer to the first queue and the buffer to the second queue based on the ratio of the first output rate to the second output rate. A size of the buffer of the first queue is a product of the output rate of the first queue and buffer time of the first queue. A size of the buffer of the second queue is a product of the output rate of the second queue and buffer time of the second queue.

In this specific embodiment, for specific implementation of the determining unit 301 and the allocation unit 302, refer to the functions and the implementation steps of the device in FIG. 2. For brevity, details are not described again.

Figure 4:
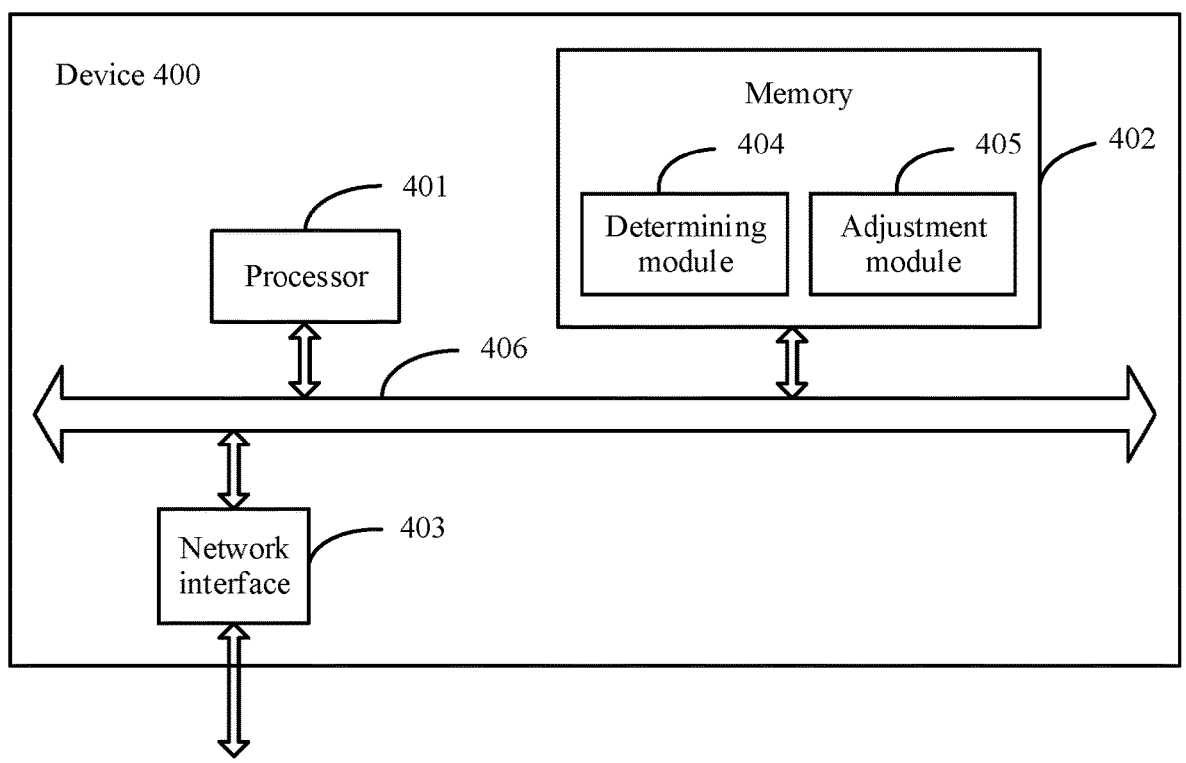
FIG. 4 is a schematic structural diagram of another device according to an embodiment of this application.

FIG. 4 is a schematic structural diagram of a device 400 according to an embodiment of this application. The device 400 may be the device shown in FIG. 1, or may be the device in the schematic method flowchart shown in FIG. 2. The device 400 may include a processor 401, and may further include a memory 402 coupled to the processor 401, and a network interface 403.

The processor 401 may be a central processing unit (CPU), a network processor (NP), or a combination of a CPU and an NP.

The processor 401 may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), generic array logic (GAL), or any combination thereof. The processor 401 may be one processor, or may include a plurality of processors.

The memory 402 may include a volatile memory, such as a random access memory (RAM). The memory may alternatively include a non-volatile memory, such as a read-only memory (ROM), a flash memory, a hard disk (HDD), or a solid-state drive (SSD). The memory 402 may alternatively include a combination of the foregoing types of memories.

In an embodiment, the memory 402 may include a plurality of software modules, such as a determining module 404 and an allocation module 405. The processor 401 may be configured to perform a plurality of operations by executing instructions in the software modules. The memory 402 may be one memory, or may include a plurality of memories. In some implementations, that a module is configured to perform an operation may actually mean that the processor 401 is configured to execute an instruction in the module, to complete the foregoing operation. The processor 401 may perform, by executing the instruction in the memory 402, some or all operations performed by the device in the methods 210 and 220. For example, the processor 401 may receive traffic, such as a first queue and a second queue, through the network interface 403.

A bus 406 may include any quantity of interconnected buses and bridges, and the bus 406 connects circuits including one or more processors that are represented by the processor 401 and a memory represented by the memory 402. The bus 406 may further connect other circuits, such as a peripheral device, a voltage stabilizer, and a power management circuit. These are known in the art, and therefore are not described in further detail in this specification.

In an embodiment, the processor 401 is configured to determine that a ratio of a first output rate to a second output rate is a first ratio. The processor 401 is further configured to determine, based on the first ratio of the first output rate to the second output rate, that a ratio of a buffer to be allocated to the first queue to a buffer to be allocated to the second queue is a second ratio. For example, the first ratio may be equal to the second ratio. The processor 401 is configured to separately allocate the buffer to the first queue and the buffer to the second queue based on the second ratio and a buffer of the device. For example, the device determines, based on the first ratio, that the second ratio is 1:1, and a size of the buffer of the device is 100 MB. In this case, the buffers to be allocated by the device to the first queue and the second queue are both 50 MB.

In an embodiment, the processor 401 is further configured to determine that a sum of buffers occupied, on the device, by a plurality of queues is greater than or equal to a threshold. The threshold is determined based on the size of the buffer of the device, and the threshold is less than or equal to a value of the buffer of the device. The plurality of queues may include the first queue and the second queue, and may further include a third queue. The processor 401 is configured to: after the processor 401 determines that the sum of the buffers occupied, on the device, by the plurality of queues is greater than or equal to the threshold, separately allocate the buffer to the first queue and the buffer to the second queue based on the ratio of the first output rate to the second output rate. For example, the threshold of the buffer of the device is 90 MB. After determining that the buffers actually occupied by the plurality of queues are 90 MB, the device starts a buffer allocation mechanism, and separately allocates the buffer to the first queue and the buffer to the second queue based on the ratio of the first output rate to the second output rate.

In an embodiment, the processor 401 is configured to determine the first output rate based on first duration and a volume of output traffic of the first queue in the first duration. The processor 401 is configured to determine the second output rate based on second duration and a volume of output traffic of the second queue in the second duration.

In an embodiment, the processor 401 is configured to separately allocate the buffer to the first queue and the buffer to the second queue based on the ratio of the first output rate to the second output rate. The processor 401 is configured to calculate a size of the buffer of the first queue as a product of the output rate of the first queue and buffer time of the first queue, and calculate a size of the buffer of the second queue as a product of the output rate of the second queue and buffer time of the second queue.

In the foregoing embodiment, for specific embodiments of implementation of the processor 401, the memory 402, and the network interface 403, refer to the functions and the operations of the device in FIG. 2. For brevity, details are not described again. Actually, operations performed by the software modules are directly or indirectly performed by the processor 401 based on the instructions in the software modules.

It should be understood that sequence numbers of the foregoing methods do not mean execution sequences in the embodiments of this application. The execution sequences of the method should be determined based on functions and internal logic of the method, and should not be construed as any limitation on the implementation processes of the embodiments of this application.

In some embodiments provided in this application, it should be understood that the disclosed method and device may be implemented in other manners. For example, the described apparatus embodiment is merely an example. For example, division into modules is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between apparatuses or units may be implemented in electronic, mechanical, or other forms.

The modules described as separate parts may or may not be physically separate, and parts displayed as modules may or may not be physical units, that is, may be located in one position, or may be distributed on a plurality of network units. Some or all of the units may be selected based on actual requirements to achieve objectives of the solutions of the embodiments.

In addition, function modules in the embodiments of the present invention may be integrated into one processing unit, or each of the modules may exist alone physically, or two or more modules are integrated into one unit. The integrated module, in embodiments, may be implemented in a form of hardware, or may be implemented in a form of hardware and a software function unit.

When, for example, the integrated unit is implemented in the form of hardware combined with software and sold or used as an independent product, the software may be stored in a computer-readable storage medium. Based on such an understanding, some technical features of the technical solutions of the present invention that contribute to the prior art may be implemented in a form of a software product. The computer software product is stored in a storage medium and includes several instructions for instructing a computer device (which may be a personal computer, a server, a device, or the like) to perform some or all operations of the method described in the embodiments of the present invention. The storage medium may be a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A buffer allocation method, comprising:
   determining, by a device, a first output rate of a first queue on the device and a second output rate of a second queue on the device; and
   separately allocating, by the device, a first buffer to the first queue and a second buffer to the second queue based on a first ratio of the first output rate to the second output rate, wherein the separately allocating the first buffer to the first queue and the second buffer to the second queue comprises at least one of:
      determining, by the device, the first ratio of the first output rate to the second output rate,
      determining, by the device based on the first ratio, a second ratio of the first buffer to be allocated to the first queue to the second buffer to be allocated to the second queue, and
      separately allocating, by the device, the first buffer to the first queue and the second buffer to the second queue based on the second ration and a buffer or the device; or
      determining, by the device, that a sum of buffers occupied on the device, by a plurality pf queues is greater than or equal to a threshold, wherein the threshold is determined based on a size of a buffer of the device, and the plurality of queues comprise the first queue and the second queue, and
      in response to determination that a sum of buffers occupied, on the device, by the plurality of queues is greater than or equal to a threshold, separately allocating, by the device, the first buffer to the first queue and the second buffer to the second queue based on the first ratio of the first output rate to the second output rate.

2. The method according to claim 1, wherein the determining, by the device, the first output rate of the first queue on the device and the second output rate of the second queue on the device comprises:
   determining, by the device, the first output rate based on a first duration and a volume of output traffic of the first queue in the first duration; and
   determining, by the device, the second output rate based on a second duration and a volume of output traffic of the second queue in the second duration.

3. The method according to claim 1, wherein the first queue and the second queue are different queues based on an identifier of a packet, the identifier comprises at least one of a 5-tuple, media access control (MAC), a protocol number, a subscriber identifier, and a device port number.

4. The method according to claim 1, wherein a size of the first buffer of the first queue is a product of the first output rate of the first queue and buffer time of the first queue, a size of the second buffer of the second queue is a product of the second output rate of the second queue and buffer time of the second queue.

5. A device, comprising:
   a memory storing an instruction; and
   a processor configured to communicate with the memory and execute the instruction to:
   determine a first output rate of a first queue on the device and a second output rate of a second queue on the device; and
   separately allocate a first buffer to the first queue and a second buffer to the second queue based on a first ratio of the first output rate to the second output rate, comprising the processor to execute the instruction to separately allocate the first buffer to the first queue and the second buffer to the second queue:
determine the first ration of the first output rate to the second output rate,
determine, based on the first ration, a second ratio of the first buffer to be allocated to the first queue to the second buffer to be allocated to the second queue, and
separately allocate the first buffer to the first queue and the second buffer to the second queue based on the second ration and a buffer or the device; and/or
determine that a sum of buffers occupied, on the device, by a plurality of queues is greater than or equal to a threshold, wherein the threshold is determined based on a size of a buffer of the device, and the plurality of queues comprise the first queue and the second queue, and
in response to determining that the sum of the buffers occupied, on the device, by the plurality of queues is greater than or equal to the threshold, separately allocate the first buffer to the first queue and the second buffer to the second queue based on the first ratio of the first output rate to the second output rate.

6. The device according to claim 5, wherein the processor is further configured to execute the instruction to:
determine the first output rate based on a first duration and a volume of output traffic of the first queue in the first duration; and
determine the second output rate based on a second duration and a volume of output traffic of the second queue in the second duration.

7. The device according to claim 5, wherein the first queue and the second queue are different queues based on an identifier of a packet, the identifier comprises at least one of a 5-tuple, media access control (MAC), a protocol number, a subscriber identifier, and a device port number.

8. The device according to claim 5, wherein a size of the first buffer of the first queue is a product of the first output rate of the first queue and buffer time of the first queue, a size of the second buffer of the second queue is a product of the second output rate of the second queue and buffer time of the second queue.

9. A non-transitory computer-readable storage medium, comprising instructions which, when executed by a computer, cause the computer to perform operations, comprising:
determining a first output rate of a first queue on the device and a second output rate of a second queue on the device; and
separately allocating a first buffer to the first queue and a second buffer to the second queue based on a first ratio of the first output rate to the second output rate, wherein the instructions, when executed by the computer, cause the computer to perform operations for separately allocating the first buffer to the first queue and the second buffer to the second queue comprising at least one of:
determining the first ratio of the first output rate to the second output rate,
determining, based on the first ration, a second ratio of the first buffer to be allocated to the first queue to the second buffer to be allocated to the second queue, and
separately allocating the first buffer to the first queue and the second buffer to the second queue based on the second ratio and a buffer of the device; or
determining that a sum of buffers occupied, on the device, by a plurality of queues is greater than or equal to a threshold, wherein the threshold is determined based on a size of a buffer of the device, and the plurality of queues comprise the first queue and the second queue; and
in response to determining that the sum of the buffers occupied, on the device, by the plurality of queues is greater than or equal to the threshold, separately allocating the first buffer to the first queue and the second buffer to the second queue based on the first ratio of the first output rate to the second output rate.

10. The non-transitory computer-readable storage medium according to claim 9, wherein the instructions, when executed by the computer, further cause the computer to perform operations, comprising:
determining the first output rate based on first duration and a volume of output traffic of the first queue in the first duration; and
determining the second output rate based on second duration and a volume of output traffic of the second queue in the second duration.

11. The non-transitory computer-readable storage medium according to claim 9, wherein the first queue and the second queue are different queues based on an identifier of a packet, the identifier comprises at least one of a 5-tuple, media access control (MAC), a protocol number, a subscriber identifier, and a device port number.

12. The non-transitory computer-readable storage medium according to claim 9, wherein a size of the first buffer of the first queue is a product of the first output rate of the first queue and buffer time of the first queue, and a size of the second buffer of the second queue is a product of the second output rate of the second queue and buffer time of the second queue.

* * * * *

UNITED STATES PATENT AND TRADEMARK OFFICE
CERTIFICATE OF CORRECTION

PATENT NO. : 11,658,924 B2
APPLICATION NO. : 17/134976
DATED : May 23, 2023
INVENTOR(S) : Yongping Zhang, Bailing Li and Xiongwei Zhang It is certified that error appears in the above-identified patent and that said Letters Patent is hereby corrected as shown below:

In the Claims

Claim 1, Column 12, Line 21, delete "based on the second ration and a buffer or the device" and insert --based on the second ratio and a buffer of the device--.

Claim 1, Column 12, Line 24, delete "by a plurality pf queues" and insert --by a plurality of queues--.

Claim 5, Column 13, Line 3, delete "determine the first ration" and insert --determine the first ratio--.

Claim 5, Column 13, Line 5, delete "based on the first ration" and insert --based on the first ratio--.

Claim 5, Column 13, Line 11, delete "second ration and a buffer or the device" and insert --second ratio and a buffer of the device--.

Claim 9, Column 14, Line 7, delete "based on the first ration" and insert --based on the first ratio--.

Signed and Sealed this
Third Day of September, 2024

Katherine Kelly Vidal
*Director of the United States Patent and Trademark Office*